United States Patent
Jang et al.

(10) Patent No.: US 8,930,672 B2
(45) Date of Patent: Jan. 6, 2015

(54) MULTIPROCESSOR USING A SHARED VIRTUAL MEMORY AND METHOD OF GENERATING A TRANSLATION TABLE

(75) Inventors: Choon-Ki Jang, Anyang-si (KR); Jaejin Lee, Seoul (KR); Soo-Jung Ryu, Hwaseong-si (KR); Bernhard Egger, Seoul (KR); Yoon-Jin Kim, Seoul (KR); Woong Seo, Hwaseong-si (KR); Young-Chul Cho, Yongin-si (KR)

(73) Assignees: SNU R&DB Foundation, Seoul (KR); Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 13/074,999

(22) Filed: Mar. 29, 2011

(65) Prior Publication Data

US 2012/0089808 A1    Apr. 12, 2012

(30) Foreign Application Priority Data

Oct. 8, 2010   (KR) .................. 10-2010-0098441

(51) Int. Cl.
*G06F 13/00*   (2006.01)
*G06F 13/28*   (2006.01)
*G06F 12/10*   (2006.01)

(52) U.S. Cl.
CPC .................. *G06F 12/1072* (2013.01)
USPC ..... 711/206; 711/118; 711/147; 711/E12.014

(58) Field of Classification Search
USPC ................. 711/206, 118, 147, E12.014
See application file for complete search history.

(56) References Cited

U.S. PATENT DOCUMENTS

| | | | |
|---|---|---|---|
| 4,939,636 A | 7/1990 | Nakagawa et al. | |
| 4,972,338 A | 11/1990 | Crawford et al. | |
| 5,173,872 A | 12/1992 | Crawford et al. | |
| 5,321,836 A | 6/1994 | Crawford et al. | |
| 6,457,100 B1* | 9/2002 | Ignatowski et al. | 711/119 |
| 6,684,305 B1 | 1/2004 | Deneau | |
| 7,395,405 B2 | 7/2008 | Anderson et al. | |
| 7,584,330 B2 | 9/2009 | McKinney et al. | |
| 7,886,126 B2 | 2/2011 | Bennett et al. | |
| 2002/0019921 A1* | 2/2002 | Hagersten et al. | 711/205 |
| 2004/0078631 A1 | 4/2004 | Rogers et al. | |
| 2005/0273571 A1* | 12/2005 | Lyon et al. | 711/203 |
| 2006/0161719 A1 | 7/2006 | Bennett et al. | |
| 2007/0157003 A1 | 7/2007 | Durham et al. | |
| 2009/0254724 A1 | 10/2009 | Vertes et al. | |

FOREIGN PATENT DOCUMENTS

| | | |
|---|---|---|
| KR | 10-1987-0003427 | 4/1987 |
| KR | 10-2003-0092101 | 12/2003 |
| KR | 10-2006-0083168 | 7/2006 |
| KR | 10-2007-0090047 | 9/2007 |
| KR | 10-2008-0037237 | 4/2008 |
| KR | 10-2008-0041436 | 5/2008 |
| KR | 10-2008-0072952 | 8/2008 |
| KR | 10-2008-0097573 | 11/2008 |

\* cited by examiner

*Primary Examiner* — Edward Dudek, Jr.
(74) *Attorney, Agent, or Firm* — NSIP Law

(57) ABSTRACT

A multiprocessor using a shared virtual memory (SVM) is provided. The multiprocessor includes a plurality of processing cores and a memory manager configured to transform a virtual address into a physical address to allow a processing core to access a memory region corresponding to the physical address.

20 Claims, 11 Drawing Sheets

FIG. 4

| | 31 30 29 28 27 26 25 24 23 22 21 20 19 18 17 16 15 14 13 12 11 10 9 8 7 6 5 4 3 2 | 1 | 0 |
|---|---|---|---|
| FAULT | IGN | 0 | 0 ← 401 |
| 1MB PAGE | TRANSLATION BASE | RESERVED | 0 | 1 ← 402 |
| 2nd NON-LS | TRANSLATION BASE | RESERVED | s | 1 | 0 ← 403 |
| 2nd LS | TRANSLATION BASE | RESERVED | s | 1 | 1 ← 404 |

FIG. 10

| | 31 30 29 28 27 26 25 24 23 22 21 20 19 18 17 16 15 14 13 12 11 10 9 | 8 | 7 6 5 4 | 3 | 2 | 1 | 0 |
|---|---|---|---|---|---|---|---|
| FAULT | IGN | | | 0 | 0 | 0 | 0 |
| 256B PAGE | RESERVED | TRANSLATION BASE | RESERVED | 0 | 1 | W | R |
| 512B PAGE | RESERVED | TRANSLATION BASE | RESERVED | 1 | 0 | W | R |
| 1KB PAGE | RESERVED | TRANSLATION BASE | RESERVED | 1 | 1 | W | R |

MULTIPROCESSOR USING A SHARED VIRTUAL MEMORY AND METHOD OF GENERATING A TRANSLATION TABLE

CROSS-REFERENCE TO RELATED APPLICATION(S)

This application claims the benefit under 35 U.S.C. §119 (a) of Korean Patent Application No. 10-2010-0098441, filed on Oct. 8, 2010, in the Korean Intellectual Property Office, the entire disclosure of which is incorporated herein by reference for all purposes.

BACKGROUND

1. Field

The following description relates to a virtual memory management technique for a multiprocessor.

2. Description of the Related Art

Multiprocessors may be equipped with two or more processing cores and are capable of handling multiple tasks at the same time. Multiprocessors have become widespread because often they achieve better performance and lower power consumption than single core processors.

There are largely two examples of multiprocessing devices. A first example is a symmetric multiprocessing (SMP) device including a plurality of processing cores of the same type. A second example is an asymmetric multiprocessing (AMP) system including different types of processing cores that can be used as general purpose processors (GPPs) such as digital processing processors (DSPs), graphic processing units (GPUs), and the like.

Research has been vigorously conducted on ways to provide a local store in each processing core of a multiprocessor to allow each processing core to access data at high speed. In the meantime, in order to use a shared virtual memory (SVM), it is necessary to determine what data should be allocated to the local store of each processing core of a multiprocessor in advance during the writing of a program. However, it is difficult to determine in advance data that should be allocated in the local store of each processing core of a multiprocessor in advance data while maintaining the precision of a program.

SUMMARY

In one general aspect, there is provided a multiprocessor using a shared virtual memory (SVM), the multiprocessor including a plurality of processing cores configured to include a local store, and a memory manager configured to generate a table indicating whether one of a plurality of pages of the SVM allocated to the local store is being used by at least one of the processing cores.

The table may include a first-level descriptor defining a page allocated to the local store.

The table may further include a second-level page descriptor including a field indicating whether the page allocated to the local store is being used by the at least one of the processing cores.

The table may further include a third-level page descriptor indicating a base address of a physical address of the page allocated to the local store.

The second-level page descriptor may further include a field indicating a number of processing cores that have permission to write on the page allocated to the local store and a field indicating whether a twin of the page allocated to the local store has been generated.

The third-level page descriptor may include a field indicating a read right or read and write rights of the at least one of the processing cores on the page allocated to the local store.

The memory manager may be further configured to convert a virtual address into a physical address based on the table.

The memory manager may be further configured to convert the virtual address into the physical address using a virtual address provided by the processing cores, identifiers of the processing cores, and the table.

The local store may include a random access memory (RAM) included in each of the processing cores.

In another aspect, there is provided a method of generating a table for realizing a shared virtual memory (SVM) for a multiprocessor including a plurality of processing cores having a local store, the method including generating a first-level page descriptor defining a page allocated to the local store, generating a second-level page descriptor including a field indicating whether the page allocated to the local store is being used by at least one of the processing cores, and generating a third-level page descriptor indicating a base address of a physical address of the page allocated to the local store.

The second-level page descriptor may further include a field indicating a number of processing cores that have permission to write on the page allocated to the local store and a field indicating whether a twin of the page allocated to the local store has been generated.

The third-level page descriptor may include a field indicating a read right or read and write rights of the at least one of the processing cores on the page allocated to the local store.

In another aspect, there is provided a processing unit in a multicore processor, the processing unit including a processing core configured to interpret and process commands, a local store configured to store data corresponding to the commands and configured to be accessed by the processing core, and a table generator configured to convert a virtual address into a physical address to allow the processing core to access a memory region corresponding to the physical address.

The table generator may convert a virtual address into a physical address of the local store to allow the processing core to access a memory region of the local store that corresponds to the physical address.

The processing unit may further comprise a shared memory that is configured to store data corresponding to the commands and configured to be accessed by the processing core and at least one other processing core of the multicore processor.

The table generator may convert a virtual address into a physical address of the shared memory to allow the processing core to access a memory region of the shared memory that corresponds to the physical address.

The table generator may generate a table with a plurality of levels, and the table generator may use the table to convert the virtual address into the physical address.

The table may comprise a first-level page descriptor that indicates whether a particular page is allocated to the local store or whether it is allocated to a shared memory that is shared by at least one other processing core of the multicore processor.

The table may further comprise a second-level page descriptor that indicates whether a particular page is being used by another processing core.

The table may further comprise a third-level page descriptor that indicates a base address of the physical address of a particular page.

Other features and aspects will be apparent from the following detailed description, the drawings, and the claims.

BRIEF DESCRIPTION OF THE DRAWINGS

FIG. 4 is a diagram illustrating examples of a first-level page descriptor of a translation table.

FIG. 10 is a diagram illustrating examples of a third-level page descriptor of a translation table.

Figure 1:
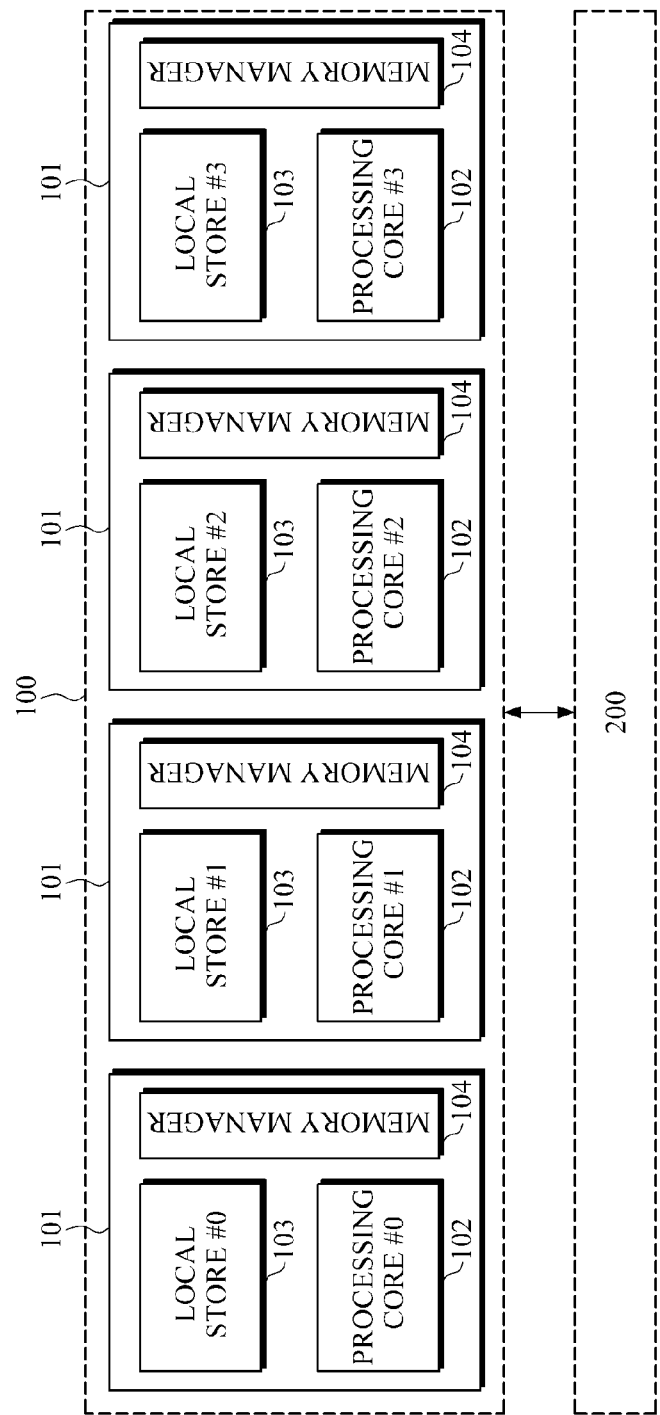
FIG. 1 is a diagram illustrating an example of a multiprocessor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a multiprocessor.

Referring to FIG. 1, a multiprocessor 100 includes a plurality of processing units 101, and may perform multiple tasks at the same time using the processing units 101. In this example, each of the processing units 101 includes a processing core 102, a local store 103, and a memory manager 104. However, it should be appreciated that not all of the processing units may include a local store 103 and a memory manager 104. For example, one or more of the processing units 101 may not include a local store 103 or a memory manager 104. Likewise, one or more of the processing units 101 may include a local store 103 and a memory manager 104.

The processing cores 102 may interpret and process commands.

The local stores 103 may store commands and data related to the commands therein. For example, the local stores 103 may be memories that are used by their respective processing cores 102 and are not shared. For example, the processing cores 102 may have their own random access memories (RAMs) as the local stores 103. A shared memory 200, which in this example is a separate memory from the local stores 103, is a memory that may be shared between the processing cores 102. The processing cores 102 may access the shared memory 200 and/or their local stores 103. Because the local stores 103 are only available for their respective processing cores 102, it may be possible for the processing cores 102 to access their local stores 103 more easily and quickly than when accessing the shared memory 200.

The memory managers 104 may translate virtual addresses into physical addresses. For example, the memory managers 104 may include a memory management unit (MMU) that is a hardware element, and a virtual memory manager (VMM) that is a software element. In response to a process being created, the memory managers 104 may set a virtual memory for the process and may generate a table. In response to the processing cores 102 attempting to access the shared memory region with a virtual address, the memory managers 104 may translate the virtual address into a physical address using the table (also referred to herein as a translation table), and may allow the processing cores 102 to access the memory region at the physical address. For example, the memory region at the physical address may be any one of the local stores 103 or the shared memory 200. That is, the memory manager may use the virtual address to provide a physical address.

For example, the memory managers 104 may generate the translation table for reference of the state of each page of a virtual memory in order for the processing cores 102 to more easily realize a shared virtual memory (SVM). For example, for processing core #0 to use a particular page of the virtual memory, processing core #0 may determine, based on the translation table, whether the particular page is included in its local store 103 or in the shared memory 200 and whether the particular page has been used by other processing cores such as the processing cores #1, #2, and #3.

The memory managers 104 may perform address translation using the translation table. For example, the memory manager 104 may use the virtual address, compare it to the translation table, and provide a physical address to the processing core. For example, the translation table may include a plurality of page descriptors that have different levels. For example, the translation table may include a first-level page descriptor that is a first-level entry of the translation table and which may be identified by the base address of the translation table and a virtual address. As another example, the translation table may include a second-level page descriptor that is a second-level entry of the translation table and which may be identified by the first-level page descriptor and the virtual address. As another example, the translation table may include a third-level page descriptor that is a third-level entry of the translation table and which may be identified by the second-level page descriptor and the virtual address.

For example, the first-level page descriptor may indicate whether a particular page is allocated to the local stores 103 or to the shared memory 200. The second-level page descriptor may include a field that indicates whether the particular page is being used by any one of the processing cores 102. The third-level page descriptor may indicate the base address of the physical address of the particular page.

For example, the memory managers 104 may generate a translation table indicating the state of the use of each page of a virtual memory, and may perform address translation using the translation table. Thus, even when the local stores 103 are occupied by commands or data, the processing cores 102 may identify the state of each page of the virtual memory and may more easily realize a SVM.

Figure 2:
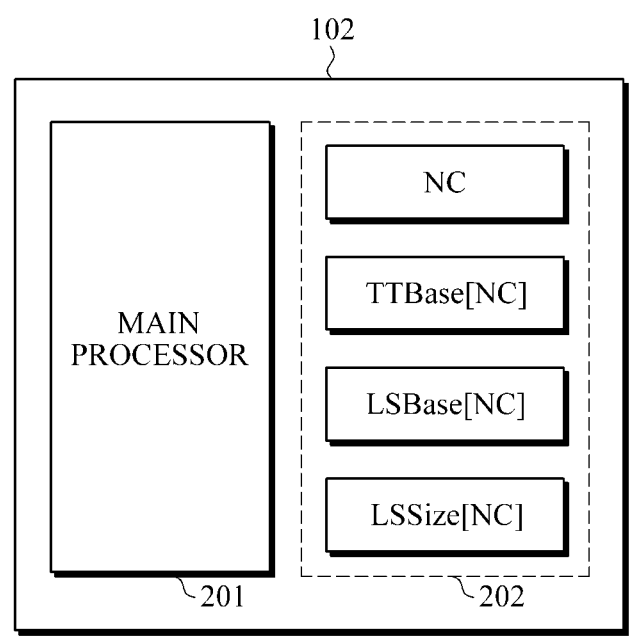
FIG. 2 is a diagram illustrating an example of a processing core.

FIG. 2 illustrates an example of a processing core.

Referring to FIGS. 1 and 2, a processing core 102 includes a main processor 201 and a plurality of registers 202. The main processor 201, which is a core element of the processing core 102, may interpret and process commands.

In this example, the register 202 includes a register NC that may store the number of processing cores 102 in the multiprocessor 100. The register 202 also includes a register TTBase[NC] that may store the location of a first-level page descriptor, for example, the physical address of a translation table for use in address translation. The register 202 also includes a register LSBase[NC] that may store the base address of the page buffer of a local store 103. The register 202 also includes a register LSSize[NC] that may store the size of the page buffer of the local store 103.

Figure 3:
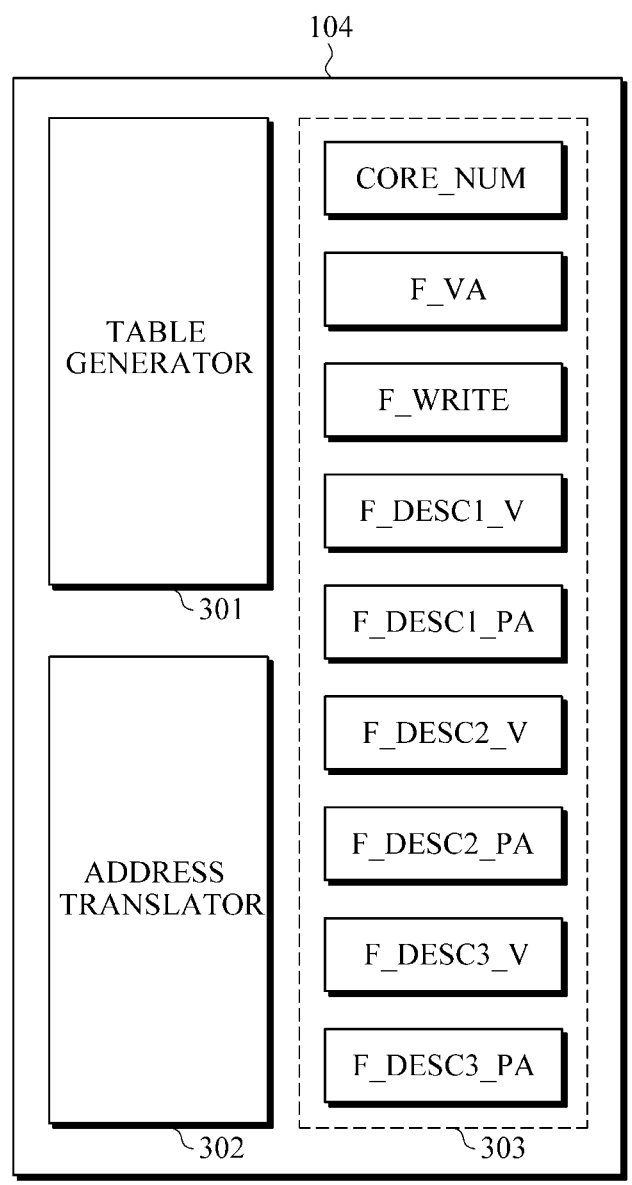
FIG. 3 is a diagram illustrating an example of a memory manager.

FIG. 3 illustrates an example of a memory manager.

Referring to FIG. 3, memory manager 104 includes a table generator 301, an address translator 302, and a plurality of registers 303.

The table generator 301 may generate a table for translating virtual addresses into physical addresses. The table generator 301 may generate a translation table that includes a plurality of levels of page descriptors, for example, one or more first-level page descriptors, one or more second-level page descriptors, and/or one or more third-level page descriptors. The first-level page descriptors may classify a plurality of pages in a virtual memory allocated to a process into pages allocated to a local store 103 and pages allocated to the shared memory 200 (shown in FIG. 1) and may define the pages allocated to the local store 103 and the pages allocated to the shared memory 200 separately. The second-level page descriptors may indicate whether the pages allocated to the local store 103 are being used by a processing core 102. The third-level page descriptors may indicate the base addresses of the pages allocated to the local store 103.

The address translator 302 may translate virtual addresses into physical addresses with reference to the translation table generated by the table generator 301. For example, when the memory manager 104 receives a virtual address from the processing core 102, the address translator 302 may search for a first-level page descriptor using the value of a register TTBase[NC] of the processing core 102 and the received virtual address. As another example, the address translator 302 may search for a second-level page descriptor using the first-level page descriptor and the received virtual address, and may obtain a physical address corresponding to the received virtual address using the second-level page descriptor, and the received address and the value of a register LSBase[NC] of the processing core 102.

The register 303 may store various data for the memory manager 104 to use to generate the translation table and to translate virtual addresses into physical addresses. The register 303 may include a plurality of registers. In this example, the register 303 includes a register CORE_NUM that may store a serial number or identifier of the processing core 102, a register F_VA that may store the virtual address of a page that has caused a page fault, a register F_WRITE that may store a value of '0' when an instruction of the page that has caused a page fault is 'load' and may store a value of '1' when the instruction of the page that has caused a page fault is 'store,' a register F_DESC1_V that may store the value of a first-level page descriptor of the page that has caused a page fault, a register F_DESC1_PA that may store the physical address of the first-level page descriptor of the page that has caused a page fault, a register F_DESC2_V that may store the value of a second-level page descriptor of the page that has caused a page fault, a register F_DESC2_PA that may store the physical address of the second-level page descriptor of the page that has caused a page fault, a register F_DESC3_V that may store the value of a third-level page descriptor of the page that has caused a page fault, and a register F_DESC3_PA that may store the physical address of the third-level page descriptor of the page that has caused a page fault.

FIG. 4 illustrates examples of a first-level page descriptor of a translation table.

Referring to FIGS. 1 and 4, first-level page descriptors may classify a plurality of pages of a virtual memory into pages allocated to the local stores 103 and pages allocated to the shared memory 200. For example, the first-level page descriptors may be used to define the pages allocated to the local stores 103 and the pages allocated to the shared memory 200, separately.

First-level page descriptors may be classified into a plurality of types, for example, four types 401, 402, 403, and 404. For example, the first-type first-level page descriptor 401 may be used to define a page that cannot be accessed, for example, a page that causes a page fault upon being accessed. The second-type first-level page descriptor 402 may store the base address (bits[31:20]) of a page, for example, 1 MB page not allocated to the local stores 103. The third- and fourth-type first-level page descriptors 403 and 404 may include S(bit[3:2]), which may be used to indicate the size of second-level pages.

Figure 5:
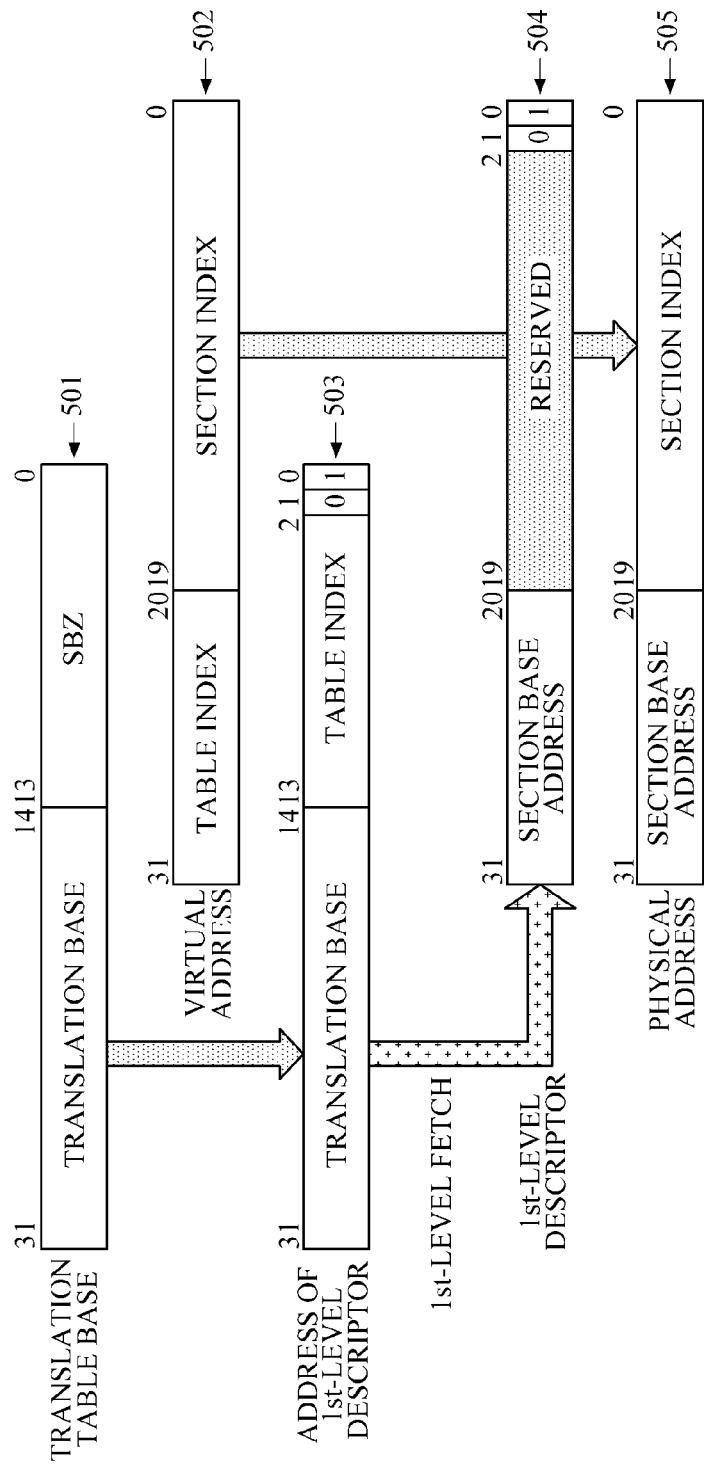
FIG. 5 is a diagram illustrating an example of translating a virtual address into a physical address.

FIG. 5 illustrates an example of translating a virtual address into a physical address. For example, a virtual address may be translated into a physical address using the second-type first-level page descriptor 402 of FIG. 4. That is, FIG. 5 illustrates an example of the first-level translation of the virtual address of a page of a SVM allocated to a shared memory into a physical address.

Referring to FIGS. 1, 4, and 5, a memory manager 104 may determine an address 503 of a first-level page descriptor 504 based on a base address 401 of a translation table and a virtual address 502. For example, the virtual address 502 may be received from a processing core 102, and the base address 501 of the translation table may be determined based on the value of a register TTBase[NC] of the processing core 102. In response to determining the address 503 of the first-level page descriptor 504, the memory manager 104 may read the first-level page descriptor 504 and may determine the type of the first-level page descriptor 504. In this example, the two least significant bits of the first-level page descriptor 504 are '01,' that identifies the first-level page descriptor 504 as a second-type first-level page descriptor, which in this example stores the base address of a 1 MB page not allocated to a local store 103.

A page having the virtual address 502 may exist in the shared memory 200 and may be defined by the first-level page descriptor 504 whose two least significant bits are 01. Therefore, the memory manager 104 may obtain a physical address 505 corresponding to the virtual address 502 using the rest of the virtual address 502 and the first-level page descriptor 504.

Figure 6:
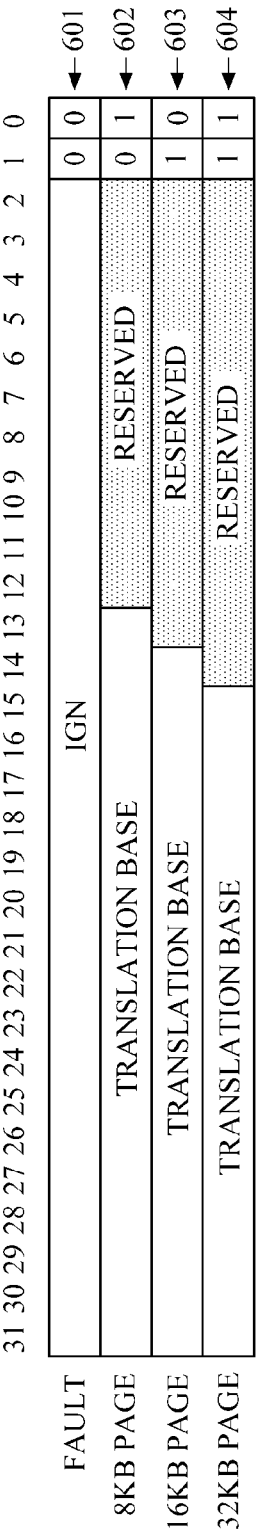
FIG. 6 is a diagram illustrating examples of a second-level page descriptor of a translation table.

FIG. 6 illustrates examples of a second-level page descriptor of a translation table. In this example, the second-level page descriptor is a second-level entry of the translation table for a page not allocated to a local store.

Referring to FIGS. 1 and 6, first, second, third, and fourth-type second-level page descriptors 601, 602, 603, and 604 may be sub-entries of the third-type first-level page descriptor 403 of FIG. 4. For example, the first, second, third, and fourth-type second-level page descriptors 601, 602, 603, and 604 may be used to define the base addresses of pages not allocated to the local stores 103.

For example, the first-type second-level page descriptor 601 may be used to define a page that cannot be accessed, for example, a page that may cause a page fault upon being accessed. The second-type second-level page descriptor 602 may store the base address (bits[31:13]) of a −8 KB page not allocated to the local stores 103. The third-type second-level page descriptor 603 may store the base address (bits[31:14]) of a 16 KB page not allocated to the local stores 103. The fourth-type second-level page descriptor 604 may store the base address (bits [31:15]) of a 32 KB page not allocated to the local stores 103.

Figure 7:
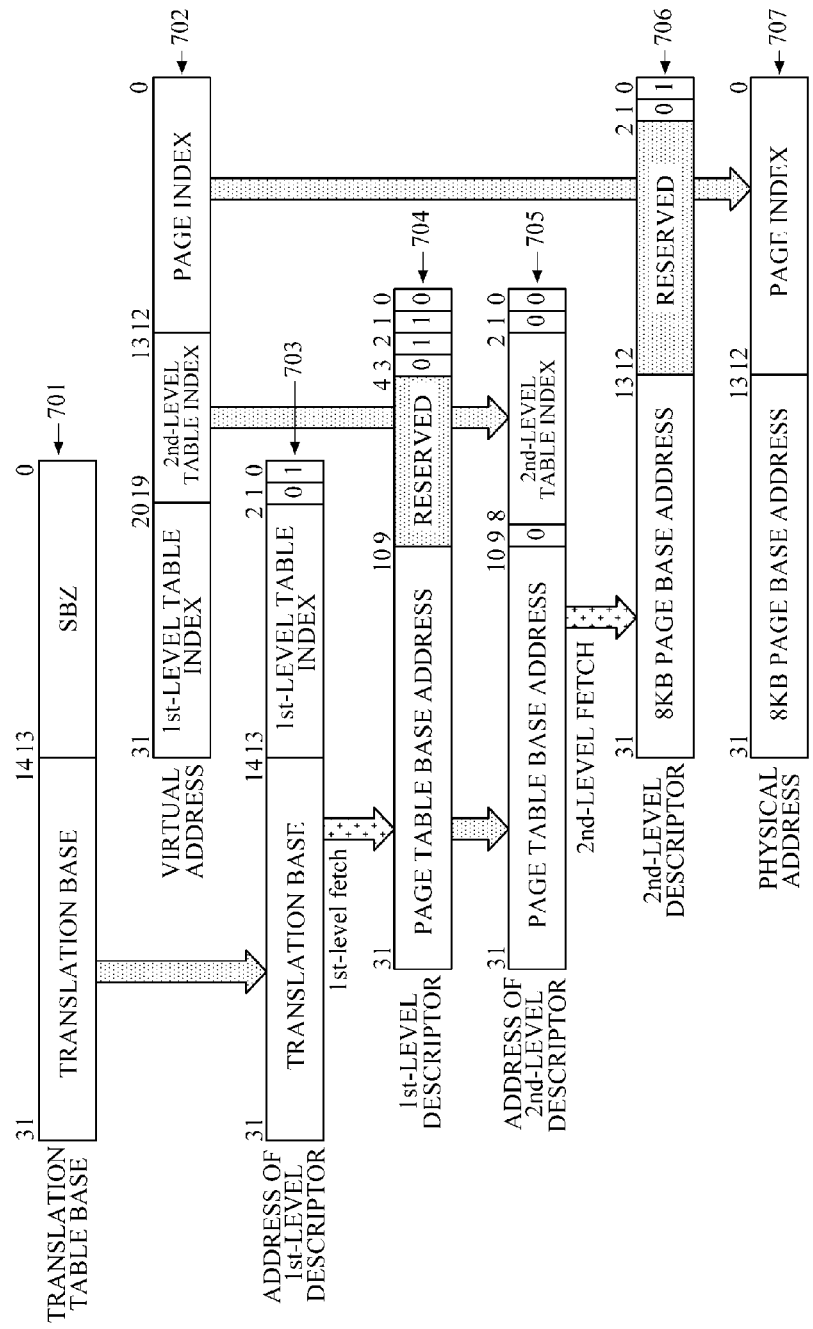
FIG. 7 is a diagram illustrating another example translating an address.

FIG. 7 illustrates another example of translating a virtual address into a physical address. In this example, a virtual address is translated into a physical address using the third-type first-level page descriptor 403 and the second-type second-level page descriptor 602. That is, FIG. 7 illustrates an example of the second-level translation of the virtual address of a page of a SVM allocated to a shared memory into a physical address.

Referring to FIGS. 1, 4, 6 and 7, a memory manager 104 may determine an address 703 of a first-level page descriptor 704 based on a base address 701 of a translation table and a virtual address 702. For example, the virtual address 702 may be received from a processing core 102, and the base address 701 of the translation table may be determined based on the value of a register TTBase[NC] of the processing core 102. In response to determining the address 703 of the first-level page descriptor 704, the memory manager 104 may read the first-level page descriptor 704 and may determine the type of the first-level page descriptor 704.

In this example, the two least significant bits of the first-level page descriptor 704 are '10,' which identifies the first-level page descriptor 704 as a third-type first-level page descriptor that stores the base address of a second-level page descriptor 706 of a 1 MB page not allocated to a local store 103. In response, the memory manager 104 may determine a physical location 705 of the second-level page descriptor 706 based on the first-level page descriptor 704 and the virtual address 702, and may read the second-level page descriptor 706 from the physical location 705.

Because two least significant bits of the second-level page descriptor 706 are '01,' the second-level page descriptor is classified as a second-type second-level page descriptor. Thus, the memory manager 104 may determine a physical address 707 corresponding to the virtual address 702 based on the second-level page descriptor 706 and the virtual address 702.

Figure 8:
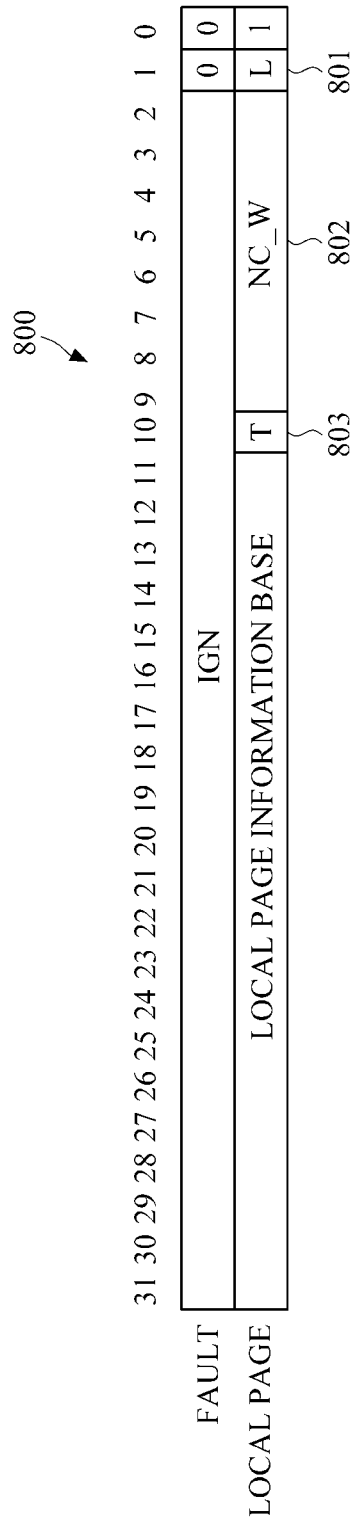
FIG. 8 is a diagram illustrating another example of a second-level page descriptor of a translation table.

FIG. 8 illustrates another example of a second-level page descriptor of a translation table. In this example, the second-level page descriptor is a second-level entry of the translation table for a page allocated to a local store.

Referring to FIGS. 1, 4 and 8, a second-level page descriptor 800 may be a sub-entry of the fourth-type first-level page descriptor 404 of FIG. 4. For example, the second-level page descriptor 800 may indicate whether a particular page allocated to a local store 103 is being accessed by a processing core 102. The second-level page descriptor 800 may include a plurality of fields, for example, a field L(bit[1])(801) indicating whether the particular page is being used by the processing core 102, a field NC_W(bits[9:2])(802) indicating the number of processing cores 102 that have permission to right on the particular page, and a field T(bit[10])(803) indicating whether a twin of the particular page has been generated.

Figure 9:
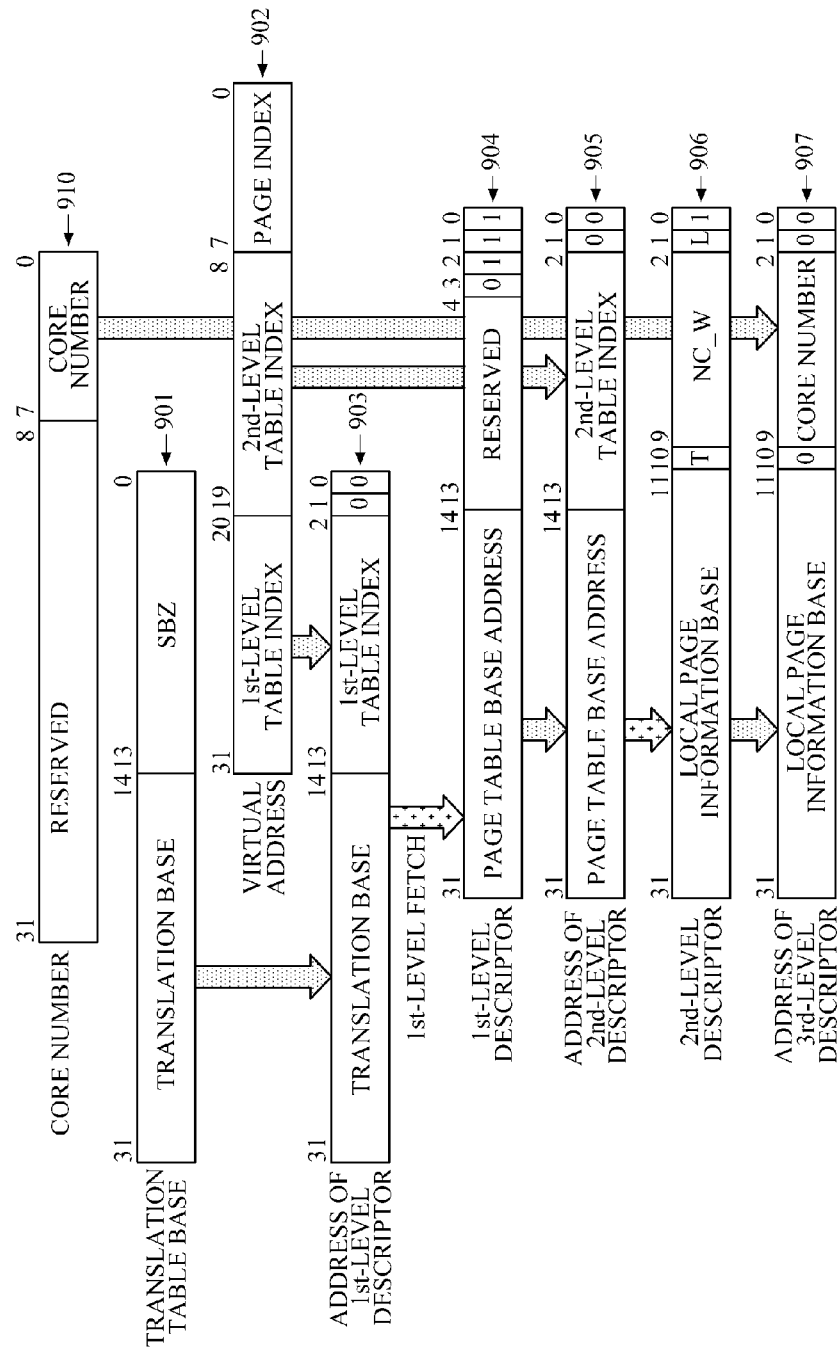
FIG. 9 is a diagram illustrating another example of translating an address.

FIG. 9 illustrates another example of translating a virtual address into a physical address. In this example, a virtual address is translated into a physical address using the fourth-type first-level page descriptor 404 of FIG. 4 and the second-level page descriptor 800 of FIG. 8. That is, FIG. 9 illustrates an example of the translation of the virtual address of a page of a SVM allocated to a local store into a physical address.

Referring to FIGS. 1, 4, 8, and 9, a memory manager 104 may determine an address 903 of a first-level page descriptor 904 based on a base address 901 of a translation table and a virtual address 902. For example, the virtual address 902 may be received from a processing core 102, and the base address 901 of the translation table may be determined based on the value of a register TTBase[NC] of the processing core 102. In response to determining the address 903 of the first-level page descriptor 904, the memory manager 104 may read the first-level page descriptor 904 and may determine the type of the first-level page descriptor 904.

In this example, the two least significant bits of the first-level page descriptor 904 are '11,' which identifies the first-level page descriptor 904 as a fourth-type first-level page descriptor that may store the base address of a second-level page descriptor 906 of a 1 MB page allocated to a local store 103. In response, the memory manager 104 may determine a physical location 905 of the second-level page descriptor 906 based on the first-level page descriptor 904 and the virtual address 902, and may read the second-level page descriptor 906 from the physical location 905.

The page corresponding to the second-level page descriptor 906 may be locked in accordance with the value of a field L of the second-level page descriptor 906. For example, if the value of the field L indicates that the page corresponding to the second-level page descriptor 906 is being used by another processing core 102, the memory manager 104 may stand-by or may treat the page corresponding to the second-level page descriptor 906 as an exception.

As another example, if the value of the field L indicates that the page corresponding to the second-level page descriptor 906 is available for use, the memory manager 104 may determine an address 907 of a third-level page descriptor based on the second-level page descriptor 906 and an identifier 910 of the processing core 102, which may be obtained from the register CORE_NUM of the memory manager 104. Because the third-level page descriptor includes the base address of the page allocated to the local store 103, the physical address of the page allocated to the local store 103 may be determined based on the third-level page descriptor and the virtual address 902.

FIG. 10 illustrates an example of a third-level page descriptor of a translation table. In this example, the third-level page descriptor is a third-level entry of the translation table for a page allocated to a local store.

Referring to FIGS. 1 and 10, a third-level page descriptor may be used to define the rights that each processing core 102 has on a page allocated to a local store 103. For example, if two least significant bits (bits[1:0]) of the third-level page descriptor are '00,' a page fault may occur upon access to the page allocated to the local store 103. In this example, W and R fields of the third-level page descriptor may be used to record the rights to read data from and write data to a page allocated to a local store 103.

The third-level page descriptor may be used to define the base addresses of pages of various sizes allocated to the local store 103. For example, the third-level page descriptor may indicate the base address of a 256 B page, 512 B page, a 1 KB page, and the like, allocated to a local store 103 using bits[3:2].

Figure 11:
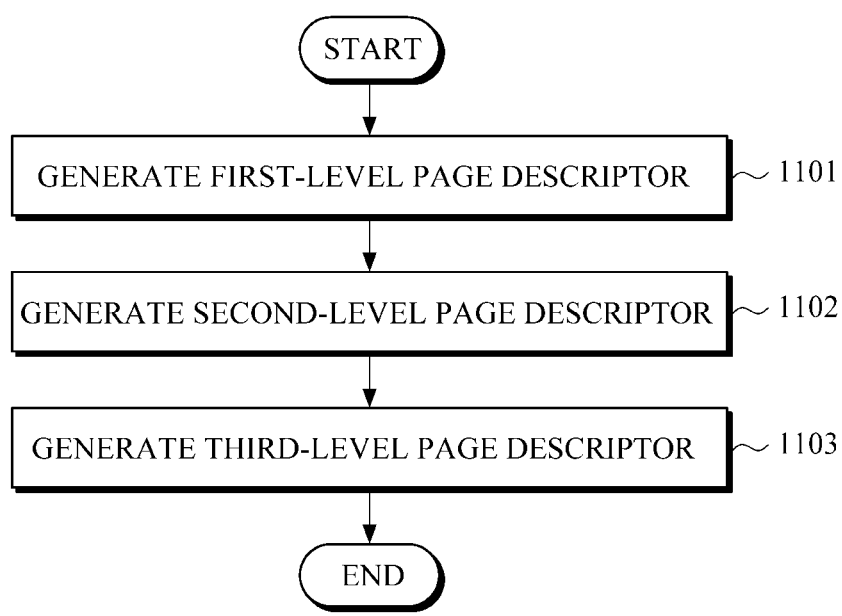
FIG. 11 is a flowchart illustrating an example of a method of generating a translation table.

FIG. 11 illustrates an example of a method of generating a translation table. In this example, a translation table is generated to realize a SVM for a multiprocessor including a plurality of processing cores each having a local store.

Referring to FIGS. 1 and 11, a first-level page descriptor that is a first level entry of a translation table to be generated, is generated, in 1101. For example, a memory manager 104 may generate a first-level page descriptor that may be used to define a page of a SVM allocated to a local store 103, as shown in FIG. 4.

In 1102, a second-level page descriptor that is a second-level entry of the translation table to be generated, is generated. For example, the memory manager 104 may generate a second-level page descriptor including a field indicating whether the page allocated to the local store 103 is being used by any processing core 102, as shown in FIGS. 6 and 8.

In 1103, a third-level page descriptor that is a third entry of the translation table to be generated, is generated. For example, the memory manager 104 may generate a third-level page descriptor indicating the base address of the page allocated to the local store 103, as shown in FIG. 10.

As described above, when a page on a SVM is allocated to the local store of a processing core, it is possible to determine whether the page has been updated by other processing cores during the translation of the virtual address of the page. Thus, it is possible to realize a SVM in a multiprocessor environment using a single translation table.

According to various aspects, a multicore processor including a plurality of processing cores may also include a memory manager. For example, at least one processing core may include a local store that stores data and that is only accessible by that respective processing core. The memory manager may be or may include a table generator that may translate a virtual address into a physical address to allow one or more processing cores to access a memory region at the physical address.

For example, the table generator may translate a virtual address into a physical address located in a memory region of a local store. As another example, the table generator may translate a virtual address into a physical address located in a memory region of a shared memory that is shared by the plurality of processing cores of the multicore processor.

As used herein, the phrase "translation table" is not meant to limit the scope of the application. The table may be used to provide a physical address. For example, a memory manger may compare a virtual address to the table to provide a physical address.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multiprocessor including a plurality of processing cores that use a shared virtual memory (SVM), the multiprocessor comprising:
    the plurality of processing cores, each of the processing cores comprising:
        a local store that is not shared with the other processing cores; and
        a memory manager configured to generate a table comprising a plurality of page descriptors with different levels, the table indicating whether one of a plurality of pages of the SVM is allocated to the local store of the respective processing core or is allocated to the shared memory,
    wherein each memory manager is further configured to receive a virtual address from the respective processing core and determine whether a physical address corresponding to the virtual address is included in the local store of the respective processing core or included in the shared memory, based on the generated table, and
    the determining by the memory manager comprises translating the virtual address into the physical address by individually comparing the virtual address to each of the different levels of the plurality of page descriptors.

2. The multiprocessor of claim 1, wherein the table includes a first-level descriptor defining a page allocated to the local store.

3. The multiprocessor of claim 2, wherein the table further includes a second-level page descriptor including a field indicating whether the page allocated to the local store is being used by the at least one of the processing cores.

4. The multiprocessor of claim 3, wherein the table further includes a third-level page descriptor indicating a base address of a physical address of the page allocated to the local store.

5. The multiprocessor of claim 3, wherein the second-level page descriptor further includes a field indicating a number of processing cores that have permission to write on the page allocated to the local store and a field indicating whether a twin of the page allocated to the local store has been generated.

6. The multiprocessor of claim 4, wherein the third-level page descriptor includes a field indicating a read right or read and write rights of the at least one of the processing cores on the page allocated to the local store.

7. The multiprocessor of claim 1, wherein the memory manager is further configured to convert a virtual address into a physical address based on the table.

8. The multiprocessor of claim 7, wherein the memory manager is further configured to convert the virtual address into the physical address using a virtual address provided by the processing cores, identifiers of the processing cores, and the table.

9. The multiprocessor of claim 1, wherein the local store includes a random access memory (RAM) included in each of the processing cores.

10. A method of generating a table for realizing a shared virtual memory (SVM) for a multiprocessor including a plurality of processing cores each of which comprising a memory manager and a local store that is not shared with the other processing cores, the method comprising:
generating a first-level page descriptor indicating whether a page is allocated to a local store of a respective processing core or is allocated to a shared memory shared by each of the plurality of processing cores;
generating a second-level page descriptor including a field indicating whether a page allocated to the local store is currently being used by the respective processing core corresponding to the local store;
generating a third-level page descriptor indicating abuse address of a physical address of the page allocated to the local store of the respective processing core; and
receiving a virtual address from a respective processing core and determining whether a physical address corresponding to the virtual address is included in the local store of the respective processing core or included in the shared memory, based on the generated table, and
the determining comprises translating the virtual address into the physical address by individually comparing the virtual address to the first-level page descriptor, the second-level page descriptor, and the third-level page descriptor.

11. The method of claim 10, wherein the second-level page descriptor further includes a field indicating a number of processing cores that have permission to write on the page allocated to the local store and a field indicating whether a twin of the page allocated to the local store has been generated.

12. The method of claim 10, wherein the third-level page descriptor includes a field indicating a read right or read and write rights of the at least one of the processing cores on the page allocated to the local store.

13. A processing unit in a multicore processor, the processing unit comprising:

a processing core configured to interpret and process commands;
a local store configured to store data corresponding to the commands and to be accessed only by the processing core; and
a table generator configured to generate a table comprising a plurality of page descriptors with different levels, the table being configured to convert a virtual address into a physical address to allow the processing core to access a memory region corresponding to the physical address,
wherein the table generator is further configured to receive the virtual address from the processing core and determine whether the physical address corresponding to the virtual address is included in the local store of the processing unit or is included in a memory that is shared with a plurality of other processing units, based on the generated table, and
the determining by the table generator comprises translating the virtual address into the physical address by individually comparing the virtual address to each of the different levels of the plurality of page descriptors.

14. The processing unit of claim 13, wherein the table generator converts a virtual address into a physical address of the local store to allow the processing core to access a memory region of the local store that corresponds to the physical address.

15. The processing unit of claim 13, further comprising a shared memory that is configured to store data corresponding to the commands and configured to be accessed by the processing core and at least one other processing core of the multicore processor.

16. The processing unit of claim 15, wherein the table generator converts a virtual address into a physical address of the shared memory to allow the processing core to access a memory region of the shared memory that corresponds to the physical address.

17. The processing unit of claim 13, wherein the table generator generates a table with a plurality of levels, and the table generator uses the table to convert the virtual address into the physical address.

18. The processing unit of claim 17, wherein the table comprises a first-level page descriptor that indicates whether a particular page is allocated to the local store or whether it is allocated to a shared memory that is shared by at least one other processing core of the multicore processor.

19. The processing unit of claim 18, wherein the table further comprises a second-level page descriptor that indicates whether a particular page is being used by another processing core.

20. The processing unit of claim 19, wherein the table further comprises a third-level page descriptor that indicates a base address of the physical address of a particular page.

* * * * *